United States Patent
Tenghamn

(10) Patent No.: US 8,446,798 B2
(45) Date of Patent: May 21, 2013

(54) MARINE ACOUSTIC VIBRATOR HAVING ENHANCED LOW-FREQUENCY AMPLITUDE

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 331 days.

(21) Appl. No.: 12/803,505

(22) Filed: Jun. 29, 2010

(65) Prior Publication Data
US 2011/0317515 A1 Dec. 29, 2011

(51) Int. Cl.
*G10K 9/12* (2006.01)
*G01V 1/04* (2006.01)

(52) U.S. Cl.
USPC ........... 367/175; 367/174; 367/142; 181/113; 181/120

(58) Field of Classification Search
USPC ............. 367/15, 24, 163, 168, 174, 175, 182; 181/110, 111, 113, 120
See application file for complete search history.

(56) References Cited

U.S. PATENT DOCUMENTS

| | | |
|---|---|---|
| 3,258,738 A | 6/1966 | Merchant |
| 3,886,493 A | 5/1975 | Farr |
| 4,049,077 A | 9/1977 | Mifsud |
| 4,159,463 A | 6/1979 | Silverman |
| 4,170,002 A * | 10/1979 | Strange ............................ 367/23 |
| 4,384,351 A | 5/1983 | Pagliarini, Jr. et al. |
| 4,420,826 A | 12/1983 | Marshall, Jr. et al. |
| 4,633,970 A | 1/1987 | Mifsud |
| 4,706,230 A | 11/1987 | Inoue et al. |
| 4,715,020 A | 12/1987 | Landrum, Jr. |
| 4,780,856 A | 10/1988 | Becquey |
| 4,823,326 A | 4/1989 | Ward |
| 4,926,392 A | 5/1990 | Handley et al. |
| 4,941,202 A | 7/1990 | Upton |
| 4,969,129 A | 11/1990 | Currie |
| 5,126,979 A | 6/1992 | Rowe, Jr. et al. |
| 5,329,499 A | 7/1994 | Molund et al. |
| 5,375,101 A | 12/1994 | Wolfe et al. |
| 5,457,752 A | 10/1995 | Engdahl et al. |
| 5,546,361 A | 8/1996 | Boucher et al. |
| 5,652,735 A | 7/1997 | Johansen et al. |
| 5,757,726 A | 5/1998 | Tenghamn et al. |
| 5,757,728 A | 5/1998 | Tenghamn et al. |
| 5,959,939 A | 9/1999 | Tenghamn et al. |
| 6,035,257 A | 3/2000 | Epperson |

(Continued)

FOREIGN PATENT DOCUMENTS

| | | |
|---|---|---|
| EP | 003029 | 12/2002 |
| EP | 008398 | 4/2007 |

(Continued)

OTHER PUBLICATIONS

JP58223998 A [Nippon Electric Co] see EPODOC abstract and figure 3.

(Continued)

*Primary Examiner* — Ian Lobo

(57) ABSTRACT

A seismic source includes a flextensional shell defining a longer axis and a shorter axis and at least one driver coupled to the flextensional shell proximate an end of the shorter axis. The seismic source may be a component of a marine seismic survey system. The marine seismic survey system may be utilized in a method of marine seismic surveying.

25 Claims, 7 Drawing Sheets

U.S. PATENT DOCUMENTS

| | | | |
|---|---|---|---|
| 6,041,888 | A | 3/2000 | Tenghamn |
| 6,076,629 | A | 6/2000 | Tenghamn |
| 6,085,862 | A | 7/2000 | Tenghamn |
| 6,488,117 | B1 | 12/2002 | Owen |
| 6,545,944 | B2 | 4/2003 | de Kok |
| 6,704,245 | B2 | 3/2004 | Becquey |
| 6,711,097 | B1 | 3/2004 | Engdahl |
| 6,766,256 | B2 | 7/2004 | Jeffryes |
| 6,851,511 | B2 | 2/2005 | Tenghamn |
| 7,167,412 | B2 | 1/2007 | Tenghamn |
| 7,257,049 | B1 | 8/2007 | Laws et al. |
| 7,327,633 | B2 | 2/2008 | Bagaini et al. |
| 7,376,045 | B2 | 5/2008 | Falkenberg et al. |
| 7,515,505 | B2 | 4/2009 | Krohn et al. |
| 7,551,518 | B1 | 6/2009 | Tenghamn |
| 7,620,193 | B2 | 11/2009 | Metheringham et al. |
| 7,881,158 | B2 | 2/2011 | Tenghamn |
| 7,881,160 | B2 | 2/2011 | Rouquette |
| 7,987,943 | B2 | 8/2011 | Wei et al. |
| 2003/0221901 | A1 | 12/2003 | Tenghamn |
| 2009/0010103 | A1 | 1/2009 | Sallas et al. |
| 2009/0245019 | A1 | 10/2009 | Falkenberg et al. |
| 2009/0321175 | A1 | 12/2009 | Tenghamn |
| 2010/0118646 | A1 | 5/2010 | Tenghamn |
| 2010/0118647 | A1 | 5/2010 | Tenghamn |
| 2010/0226203 | A1* | 9/2010 | Buttle et al. ............ 367/15 |
| 2010/0254215 | A1* | 10/2010 | Cambois ............ 367/20 |
| 2010/0322028 | A1 | 12/2010 | Tenghamn |
| 2011/0038225 | A1 | 2/2011 | Tenghamn |
| 2011/0149683 | A1* | 6/2011 | Lunde et al. ............ 367/21 |

FOREIGN PATENT DOCUMENTS

| | | |
|---|---|---|
| RU | 1056100 | 11/1983 |
| RU | 2045079 | 9/1995 |
| RU | 2126983 | 2/1999 |
| WO | 2010002431 A1 | 1/2010 |
| WO | 2010037937 A1 | 4/2010 |

OTHER PUBLICATIONS

United Kingdom Search Report for Application No. GB1111034.3, Mailing Date: Sep. 30, 2011.

H. A. J. Rijnja, Low Frequency Projectors for Sound Under Water, Netherlands Organization for Applied Scientific Research, Jan. 1991, Report No. FEL-90-A268, The Hague, The Netherlands.

Feng Xia, Q. M. Zhang, Z. Y. Cheng, A Class IV Flextensional Device Based on Electrostrictive Poly(vinylidene fluoride-trifluoroethylene) Copolymer, Jun. 2003.

Stig Rune Lennart Tenghamn, An Electrical Marine Vibrator with a Flextensional Shell, Exploration Geophysics, Dec. 2006, vol. 37, No. 4, Oxford, England.

H. A. J. Rijnja, Report No. FEL-90-A268, Netherlands Organization for Applied Scientific Research, Low Frequency Projectors for Sound Under Water, Jan. 1991.

Stig Rune Lennart Tenghamn, An Electrical Marine Vibrator with a Flextensional Shell, Exploration Geophysics, vol. 37, No. 4, Dec. 2006, Oxford, England.

Feng Xia, A Class IV Flextensional Device Based on Electrostrictive Poly (vinylidene fluoride-trifluoroethylene) Copyolymer, Jun. 2003.

* cited by examiner

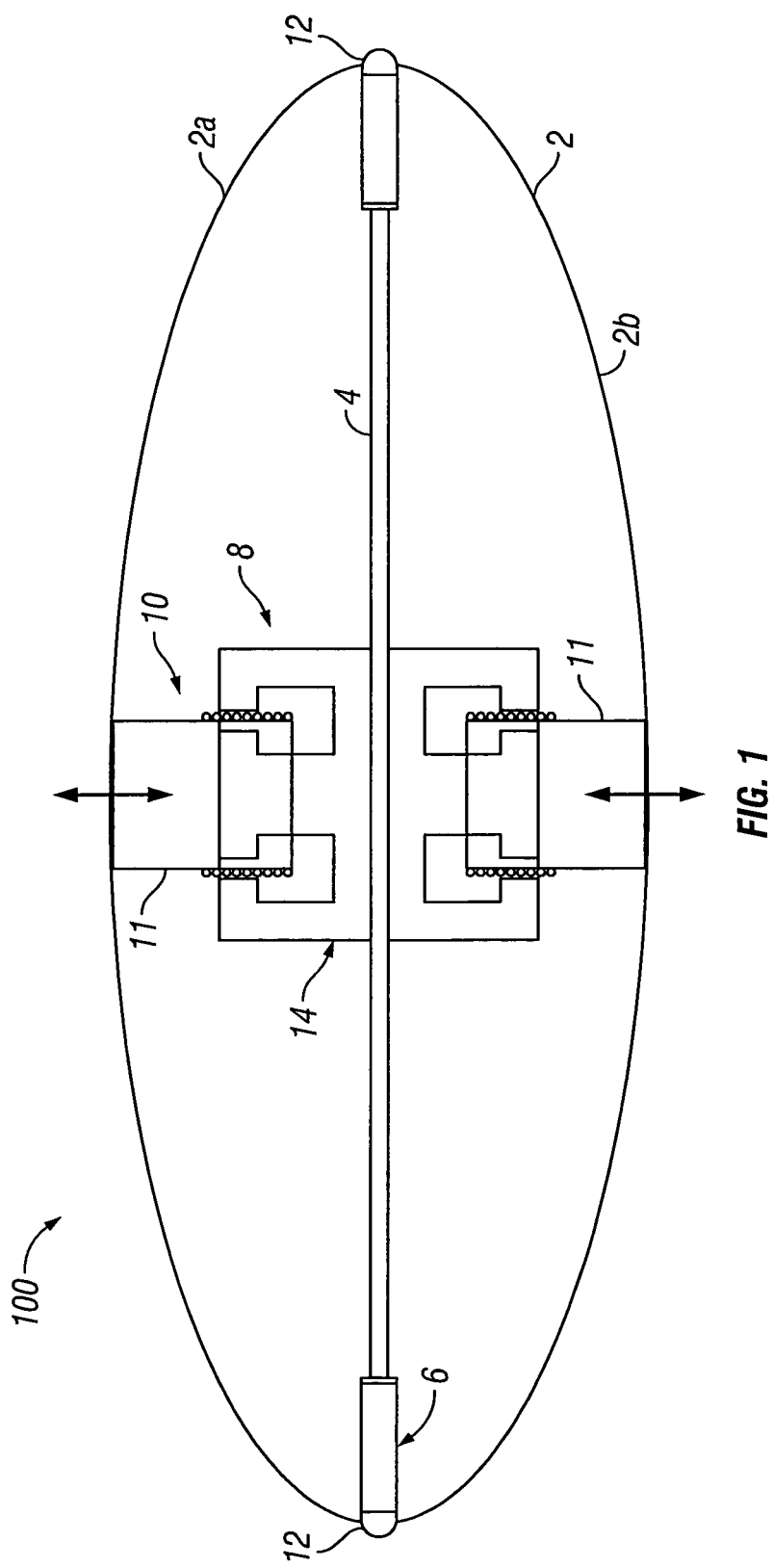

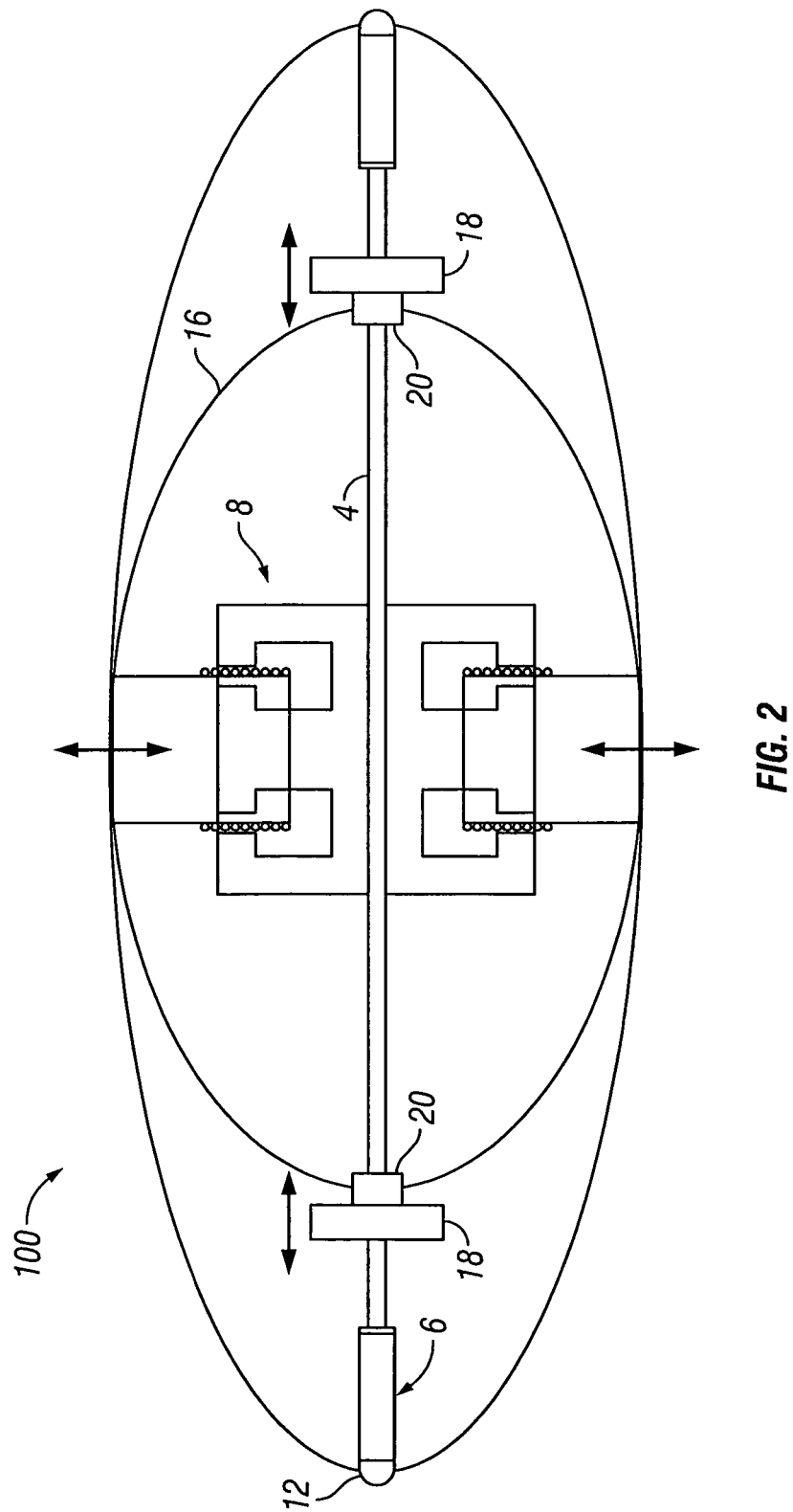

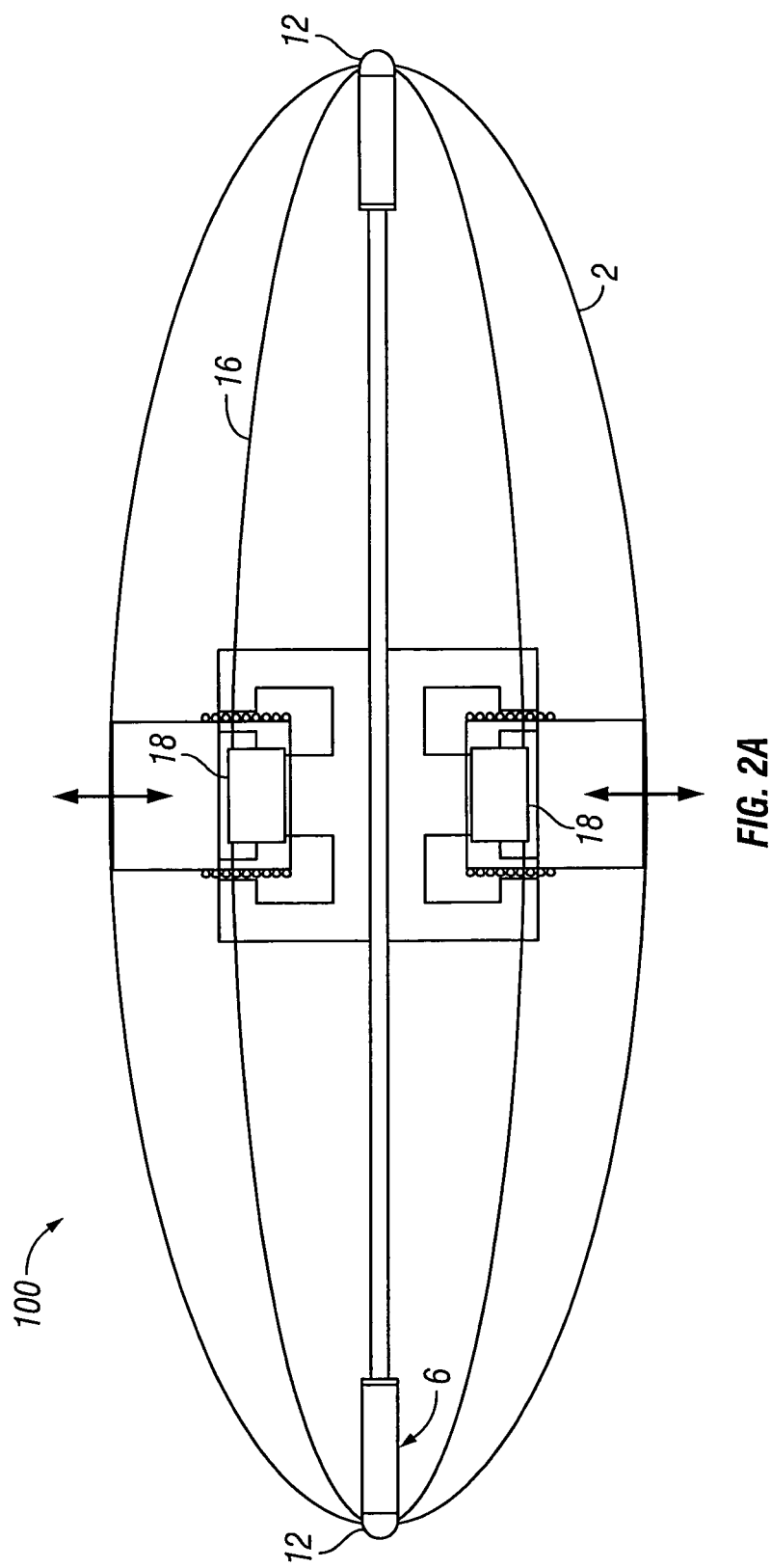

Resonance 1 = 2.5 Hz
Resonance 2 = 4.5 Hz

MARINE ACOUSTIC VIBRATOR HAVING ENHANCED LOW-FREQUENCY AMPLITUDE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine seismic surveying. More specifically, the invention relates to acoustic vibrator type seismic energy sources used for marine seismic surveying.

Seismic sources are used in geophysical surveying both on land and in water-covered areas of the earth. Signals generated by seismic sources travel downwardly into the earth, are reflected from interfaces in the subsurface, and are detected by signal detectors, typically hydrophones or geophones, on or near the earth's surface or water surface.

Most of the seismic sources used in marine surveying operations are of the impulsive type, in which efforts are made to generate as much acoustic energy as possible during as short a time span as possible. Examples of such sources include air guns, water guns, and arrays of such guns. The frequency content of such sources is controllable only to a small degree, principally by adding additional guns with different charge chamber sizes to a gun array. Different source arrays are selected for the generation of different frequency ranges for different surveying needs. Impulsive sources generally have a limited acoustic output in the very low frequency band from 1-10 Hz, and especially below 5 Hz.

Another type of seismic source is an acoustic vibrator. Acoustic vibrator type sources known in the art include hydraulically powered sources, conventional flextensional shell sources, and sources employing piezoelectric or magnetostrictive material. Acoustic vibrators tend to offer better frequency control than impulsive sources. Similar to impulsive sources, acoustic vibrators generally have a very limited acoustic energy output below 10 Hz.

Typical flextensional shell sources are based on the principle of changes in volume in a vibrating, generally elliptic shell. When the longer, major axis of an ellipse is set into vibration by a driving force (e.g., an electro-dynamic driver), the length of the shorter, minor axis will also vibrate, but with a much larger amplitude. However, for very low frequencies it can be rather problematic to generate enough amplitude by standard flextensional shell sources (e.g., using piezoceramic or Terfenol-D type of driver attached to the end of the major axis in the ellipsoid). For example, since the force generated drops-off rapidly with distance between the magnets, many conventional electro-magnetic drivers may be unable to generate sufficient force for large-amplitude applications. Some flextensional shell sources use additional mechanisms to further enhance the driving force applied to the major axis of the shell. Examples of such may be found in U.S. Pat. Nos. 5,959,939, 6,076,629 and 7,551,518, each issued to Tenghamn, and each herein incorporated by reference.

It is known in the art that, as acoustic waves travel through water and through subsurface geological structures, higher frequency acoustic waves are attenuated more rapidly than lower frequency waves. Consequently, lower frequency sound waves can be transmitted over longer distances through water and geological structures than higher frequency sound waves.

A generally elliptical flextensional shell source may be designed with a low fundamental resonance frequency so that the shell's dimensions are small compared to the wavelength in water, thereby allowing the flextensional shell to radiate sound omnidirectionally. However, due to the relatively small size of the flextensional shell (compared to the wavelength in water), the acoustic load is low at low frequencies and strongly reactive, typically requiring a large velocity amplitude of the radiating surface. Hence the allowable maximum stress in the shell is a limitation in the power output of typical elliptical flextensional shells with low resonance frequencies.

There has been a long standing need in the seismic sector of the oil and gas industry for powerful, low frequency marine sound sources operating in the frequency band 1-10 Hz.

SUMMARY OF THE INVENTION

A seismic source according to one aspect of the invention comprises a flextensional shell defining a longer axis and a shorter axis. The seismic source further comprises at least one driver coupled to the flextensional shell proximate an end of the shorter axis.

A marine seismic survey system according to another aspect of the invention comprises at least one vessel. The marine seismic survey system further comprises at least one seismic source. The seismic source comprises a flextensional shell defining a longer axis and a shorter axis, and at least one driver coupled to the flextensional shell proximate an end of the shorter axis. The marine seismic survey system further comprises an electrical controller capable of controlling the driver.

A method of marine seismic surveying according to another aspect of the invention comprises towing a seismic sensor streamer with a vessel through a body of water over a subterranean formation. The method further comprises controlling a seismic source to generate a seismic signal. The seismic source comprises a flextensional shell defining a longer axis and a shorter axis, and at least one driver coupled to the flextensional shell proximate an end of the shorter axis. The method further comprises allowing the seismic signal to propagate through the body of water and the subterranean formation to provide a modified seismic signal. The method further comprises detecting the modified seismic signal with the seismic sensor streamer.

Other aspects and advantages of the invention will be apparent from the following description and the appended claims.

BRIEF DESCRIPTION OF THE DRAWINGS

FIG. 1 shows a cross-section of a driver and flextensional shell for an acoustic vibrator according to an embodiment of the invention.

FIG. 2 shows a cross-section of a driver, flextensional shell, and inner spring with added masses, according to an embodiment of the invention.

FIGS. 2A and 2B show an alternative arrangement of inner spring and added masses, as viewed from the top and side, respectively.

DETAILED DESCRIPTION

Figure 1A:
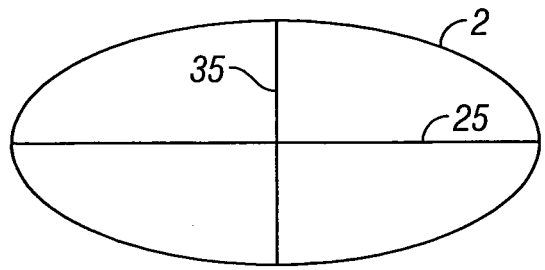
FIG. 1A shows outlines of cross-sections of flextensional shells according to embodiments of the invention.
Figure 1A:
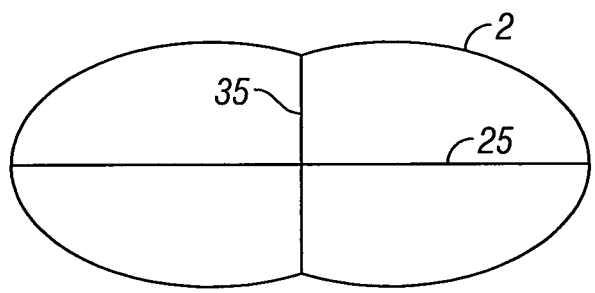
Figure 1A:
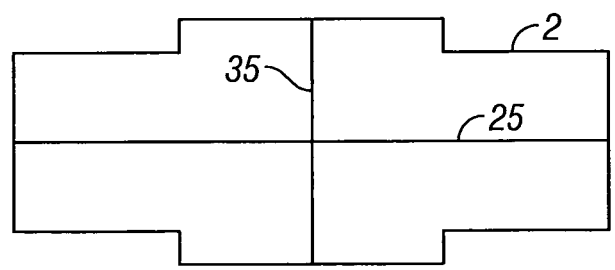
Figure 1A:
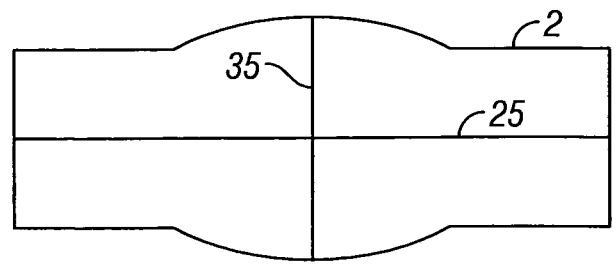
Figure 2B:
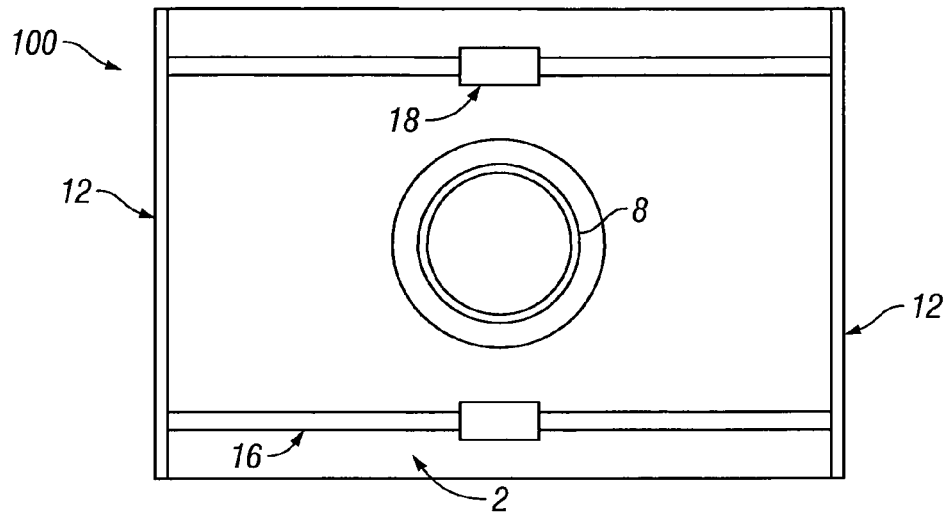

FIG. 1 shows an acoustic vibrator type seismic source 100 in partial cross-section, according to an embodiment of the invention. The seismic source 100 may include driver 8, which may be an electro dynamic driver. In some embodiments (described in more detail below), driver 8 may be a "moving coil" or "voice coil" driver, which may provide the ability to generate very large acoustic energy amplitudes. (Seismic sources utilizing moving coil drivers may be referred to as "moving coil projectors.") Although the particular embodiment described herein shows only a single, bi-directional driver, embodiments with one or more uni-directional drivers or in which a plurality of drivers are utilized in parallel, are within the scope of the invention. The illustrated embodiment further includes a flextensional shell 2, which may be made from spring steel or similar resilient metal, and which may be a class V flextensional transducer. Examples of suitable flextensional shells are generally discussed in U.S. Pat. No. 6,076,629 issued to Tenghamn. The flextensional shell 2 may be formed from two semi-elliptical halves 2A, 2B, joined at or near the ends of their longer, major axes by respective hinges 12. The driver 8 may be connected to the face of the two semi-elliptical halves 2A, 2B of flextensional shell 2. For example, as illustrated in FIG. 2B, the driver 8 may be connected at approximately the vertical midpoint of the face of flextensional shell 2, proximate the ends of the shorter, minor axes of semi-elliptical halves 2A, 2B. In a particular implementation of the invention, the flextensional shell 2 may act as a spring having a first spring constant to generate a first system resonance. As would be understood by one of ordinary skill in the art with the benefit of this disclosure, the spring constant of the flextensional shell may be determined by the dimensions of the shell (e.g., about 2 meters wide by about 2 meters tall), the material make-up of the shell, and the shape of the shell in a relaxed state. Although FIG. 1 depicts a flextensional shell of essentially semi-elliptical shape, flextensional shells of other shapes, including convex, concave, flat, or combinations thereof may also be suitable, as illustrated in FIG. 1A. In such embodiments, hinges 12 may continue to join two halves of flextensional shell 2 at or near the ends of the longer axis 25 of the shell, while driver 8 may continue to be connected to the faces of the halves proximate the ends of the shorter axis 35 of the shell. (It should be understood that, as with the major and minor axes of an ellipse, the longer and shorter axes are perpendicular to one another.) Ideally, the dimensions, material make-up, and shape of the flextensional shell will be selected to provide a soft spring constant for vibrations of between about 1-10 Hz when the shell is submerged in water.

In some embodiments, the seismic source 100 further may include a fixture 4 capable of suspending driver 8 within flextensional shell 2. For example, in the illustrated embodiment, fixture 4 extends along the major axis of flextensional shell 2 and is coupled to flextensional shell 2 with linear bearings 6. In some embodiments, fixture 4 may be circular in cross section and may be mounted to hinges 12 using linear bearings 6. Such mounting may enable contraction of the major axis of the flextensional shell 2 when the minor axis is enlarged by the motion of the driver 8.

In the illustrated embodiment, the driver 8 comprises a bi-directional, moving coil driver, having two sets of electric coil 10, transmission element 11, and magnetic circuitry 14 which is capable of generating a magnetic field. As illustrated, magnetic circuitry 14 may be connected to fixture 4, while transmission element 11 connects to flextensional shell 2. In some embodiments, this arrangement is reversed (i.e., magnetic circuitry 14 connects to flextensional shell 2, while transmission element 11 connects to fixture 4). By attaching the heavier part (magnetic circuitry 14) of the driver 8 to the shell 2, it may be easier to generate low frequencies without having to make the shell 2 too weak to allow for a soft spring constant. As illustrated, each transmission element 11 may transfer motion of electric coil 10 to the inner surface of flextensional shell 2 proximate its minor axis. Electric coil 10 may be coupled to suitable electrical controller (42 in FIG. 4) to control the driver 8. For example, the electrical controller (42 in FIG. 4) could control current through the driver, e.g., swept frequency alternating current through a range of about 1 to about 100 Hz, or more particularly between about 1 and about 10 Hz. Often, magnetic circuitry 14 may comprise permanent magnets, though any device capable of generating a magnetic flux may be incorporated. When electrical current I is applied to the electric coil 10, a force F acting on electric coil 10 may be generated:

$$F = I/B, \quad (Eq. 1)$$

wherein l is the length of the conductor in the electric coil and B is the magnetic flux generated by the magnetic circuitry 14. For constant length l and magnetic flux B, the magnitude of the electrical current I thereby determines the magnitude of the force F acting on the electric coil 10. Force F may cause electric coil 10 to move, and transmission element 11 may transfer this movement and force F to flextensional shell 2, which may flex while resisting the movement and force F. Consequently, the magnitude of the electrical current I also determines the length of the driver stroke. Driver 8 may provide stroke lengths of several inches—up to and including about 10"—which may allow seismic source 100 to generated enhanced amplitude acoustic output in the low frequency ranges, for example, between about 1 about 100 Hz, and more particularly, between about 1 and 10 Hz. Examples of suitable drivers 8 may be found in U.S. Pat. No. 5,959,939 issued to Tenghamn et al., which is incorporated herein by reference.

In some embodiments of the present invention, the seismic source 100 displays at least one resonant frequency (when the shell is submerged in water) within the seismic frequency range of between about 1 Hz and about 10 Hz. The seismic source 100 may display at least two resonant frequencies within the range of between about 1 Hz and about 50 Hz. In certain embodiments, the seismic source 100 may display at least two resonant frequencies below about 10 Hz.

As would be understood by one of ordinary skill in the art with the benefit of this disclosure, the total impedance that will be experienced by a marine acoustic vibrator may be expressed as follows:

$$Z_r = R_r + jX_r \quad (Eq. 2)$$

where $Z_r$ represents the total impedance, $R_r$ represents the radiation impedance, and $X_r$ is the reactive impedance. In an analysis of the energy transfer of a marine acoustic vibrator, the acoustic vibrator and its operating components may be approximated as a baffled piston. In an expression of the total impedance that will be experienced by a baffled piston, the radiation impedance $R_r$ of a baffled piston is:

$$R_r = \pi a^2 \rho_0 c R_1(x) \quad \text{(Eq. 3)}$$

and the reactive impedance is:

$$X_r = \pi a^2 \rho_0 c X_1(x) \quad \text{(Eq. 4)}$$

in which $$x = 2ka = \frac{4\pi a}{\lambda} = \frac{2\omega a}{c} \quad \text{(Eq. 5)}$$

$$R_1(x) = 1 - \frac{2}{x} J_1(x) \quad \text{(Eq. 6)}$$

and $$X_1(x) = \frac{4}{\pi} \int_0^{\frac{\pi}{2}} \sin(x\cos\alpha)\sin^2\alpha \, d\alpha \quad \text{(Eq. 7)}$$

In the foregoing expressions, $\rho_0$ represents the density of water (in which the radiating surface of the acoustic vibrator is immersed), $\omega$ represents angular frequency, k represents the wave number of the acoustic energy, a represents radius of piston, c represents sound velocity in water, $\lambda$ represents wave length, and $J_1$ is a Bessel function of the first order.

Using the Taylor series expansion on the above equations yields the following expressions for $R_1(x)$ and $X_1(x)$:

$$R_1(x) = \frac{x^2}{2^2 1! 2!} - \frac{x^4}{2^4 2! 3!} + \cdots \quad \text{(Eq. 8)}$$

$$X_1(x) = \frac{4}{\pi}\left[\frac{x}{3} - \frac{x^3}{3^2 \cdot 5} + \frac{x^5}{3^2 \cdot 5^2 \cdot 7} - \cdots\right] \quad \text{(Eq. 9)}$$

For low frequencies, i.e., when x=2ka is much smaller than 1, the real (R) and imaginary (X) part of the total impedance expression may be approximated with the first term of the Taylor expansion. The expressions for low frequencies, when the wavelength is much larger than the radius of the piston, then become:

$$R_1(x) \to \frac{1}{2}(ka)^2 \quad \text{(Eq. 10)}$$

$$X_1(x) \to \frac{8ka}{3\pi} \quad \text{(Eq. 11)}$$

Therefore, for low frequencies the radiation impedance R will be small compared to the reactive impedance X, which suggests very low efficiency signal generation, and consequently, low signal output amplitude. However, by introducing a resonance in the lower end of the frequency spectrum of the acoustic vibrator structure, low frequency acoustic energy may be generated more efficiently. At resonance the imaginary (reactive) part of the impedance is substantially cancelled, and the acoustic source is able to efficiently transmit acoustic energy into the water.

FIG. 2 shows another embodiment of seismic source 100, including the addition of a generally elliptically-shaped inner spring 16 inside the flextensional shell 2 with masses 18 attached thereto along the ends of the major axis and slidably supported on the fixture 4 using linear bearings 20. Inner spring 16 may be coupled to flextensional shell 2 proximate the minor axis of each. Driver 8 may be coupled to flextensional shell 2 as in the embodiment illustrated in FIG. 1. As further discussed below, the inner spring 16 with masses 18 attached thereto may cause a second system resonance frequency when the shell is submerged in water within the seismic frequency range of interest (e.g., between about 1 and about 10 Hz). Although an seismic source 100 that included only the flextensional shell 2 acting as a spring would typically display a second resonance frequency, for systems having a size suitable for use in geophysical exploration, the second resonance frequency when the shell is submerged in water would typically be much higher than the frequencies within the seismic frequency range of interest.

In some embodiments, as shown in FIGS. 2A and 2B, the major axis ends of the inner spring 16 may be coupled to the major axis ends of the flextensional shell 2 at the hinges 12. Masses 18 may be affixed to the inner spring 16 proximate its minor axis. As illustrated in FIG. 2B, the inner spring 16 may be vertically divided into two springs, each with added masses 18. In the illustrated embodiment, one inner spring 16 is disposed above driver 8, while the other inner spring is disposed below driver 8, and driver 8 remains coupled to flextensional shell 2.

Figure 3:
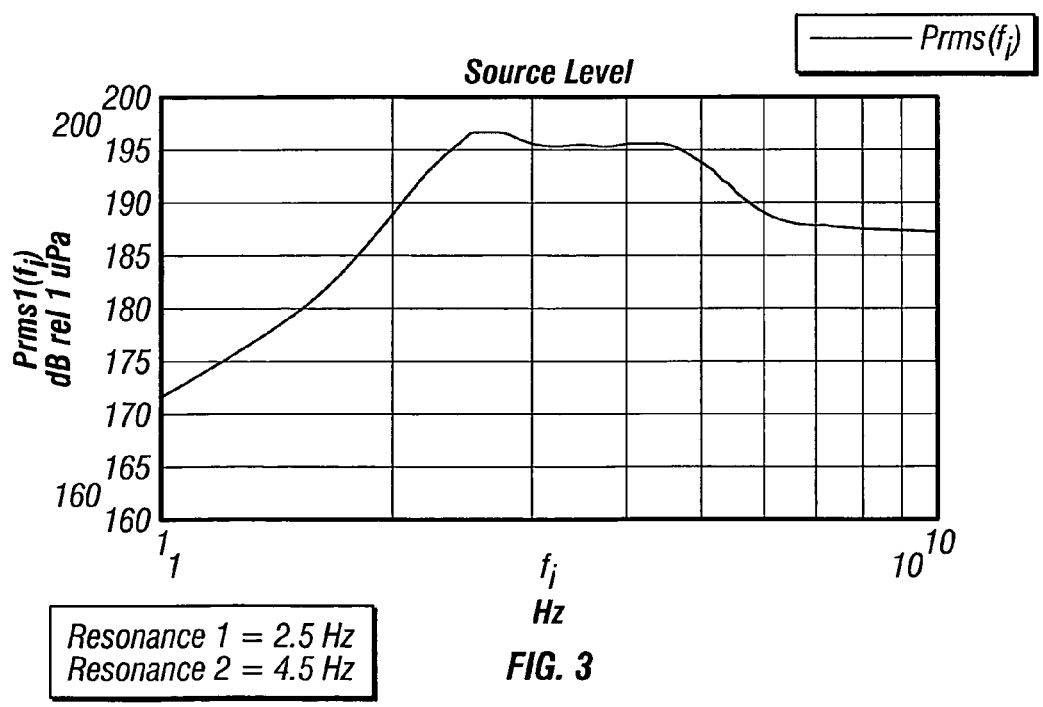
FIG. 3 shows a graph of frequency response of the acoustic vibrator in FIG. 2.

FIG. 3 shows a graph of a simulation of a marine acoustic vibrator made substantially as shown in FIG. 2. The first resonance frequency results substantially from interaction of the flextensional shell acting as a spring. The second resonance frequency results substantially from the interaction of the inner spring with its added masses. In the present example the first resonance was set to about 2.5 Hz and the second resonance was set to about 4.5 Hz.

In constructing any specific implementation of the invention, finite element analysis may be used as known to those of ordinary skill in the art. In any such analysis, the following principles of operation are relevant. If the flextensional shell is approximated as a piston, then, for low frequencies, the mass load, or the equivalent fluid mass acting on the flextensional shell is:

$$M_{shell} = \rho_0 \frac{8a^3}{3} \quad \text{(Eq. 12)}$$

where M represents the mass load, $\rho_0$ represents the density of water, and a represents the equivalent radius for a piston which corresponds to the external surface area of flextensional shell.

When the flextensional shell 2 has a spring constant $K_{shell}$ in the direction of the moving electrical coils in the driver 8, the first resonance, $f_{resonance-1}$, for the acoustic vibrator system will be substantially determined by the following mass-spring relationship:

$$f_{resonance-1} = \frac{1}{2\pi}\sqrt{\frac{K_{shell}}{M_{shell}}} \quad \text{(Eq. 13)}$$

To achieve efficient energy transmission with the seismic frequency range of interest, in many cases from about 1 to about 10 Hz, it may be important to obtain a second resonance frequency within the seismic frequency range of interest. In the absence of the inner mass spring, the second resonance frequency would occur when the flextensional shell has its second Eigen-mode. This resonance frequency, however, is normally much higher than the first resonance frequency, and accordingly, would be outside the seismic frequency range of interest. As is evident from the foregoing equation, the resonant frequency will be reduced if the mass load on flextensional shell is increased. This mass load could be increased by adding mass to the flextensional shell, however, in order to add sufficient mass to achieve a second resonance frequency within the seismic frequency range of interest, the amount of mass that would need to be added to the flextensional shell would make such a system impractical for use in marine seismic operations.

In the example illustrated in FIG. 2, a second spring, the inner spring 16, is included inside the flextensional shell 2 with added masses 18. The inner spring will have a transformation factor $T_{inner}$ between the major and minor axes of its ellipse, so that the deflection of the two side portions (at the ends of its minor axis) will have higher amplitude than the deflection of the ends of its major axis attached to the flextensional shell. The effect of such added mass is equivalent to adding mass in the end of the driver where it is attached to the flextensional shell.

$$M_{inner} = (T_{inner})^2 \cdot M_{added} \quad \text{(Eq. 14)}$$

Use of the inner spring 16 with the added masses 18 enables the second resonance of the system to be tuned so that the second resonance falls within the seismic frequency range of interest, thereby improving the amplitude of the acoustic vibrator for seismic operations. The second resonance may be expressed as:

$$f_{resonance-2} = \frac{1}{2\pi} \sqrt{\frac{K_{inner} + K_{shell}}{(T_{inner})^2 \cdot M_{added} + M_{shell}}} \quad \text{(Eq. 15)}$$

where $K_{inner}$ represents the spring constant of inner spring, and $K_{shell}$ represents the spring constant of flextensional shell.

It is possible, as shown above, to select the mass to tune the second resonance. It is also possible to select the extent of influence the second resonance has on the system. If the inner spring has a low spring constant compared to that of the flextensional shell and a matching mass is added to the inner spring, the inner spring with its mass will function essentially independently from the flextensional shell. In such cases, the second resonance can be expressed as follows:

$$f_{resonance-2} = \frac{1}{2\pi} \sqrt{\frac{K_{inner}}{(T_{inner})^2 \cdot M_{added}}} \quad \text{(Eq. 16)}$$

In the same way, it is also possible to make the second resonance very large by selecting a high spring constant for the inner spring with a matching mass; the second resonance in such cases will have larger amplitude than the first resonance.

Marine acoustic vibrators according to the foregoing may create very large seismic energy amplitudes at low frequencies (e.g., between about 1 and about 100 Hz, and more particularly, between about 1 and about 10 Hz). The driver may work in phase with the shell, and the size of the device can be optimized with respect to operational constraints. Moreover, fewer spring elements may reduce losses due to fewer connection points.

Figure 4:
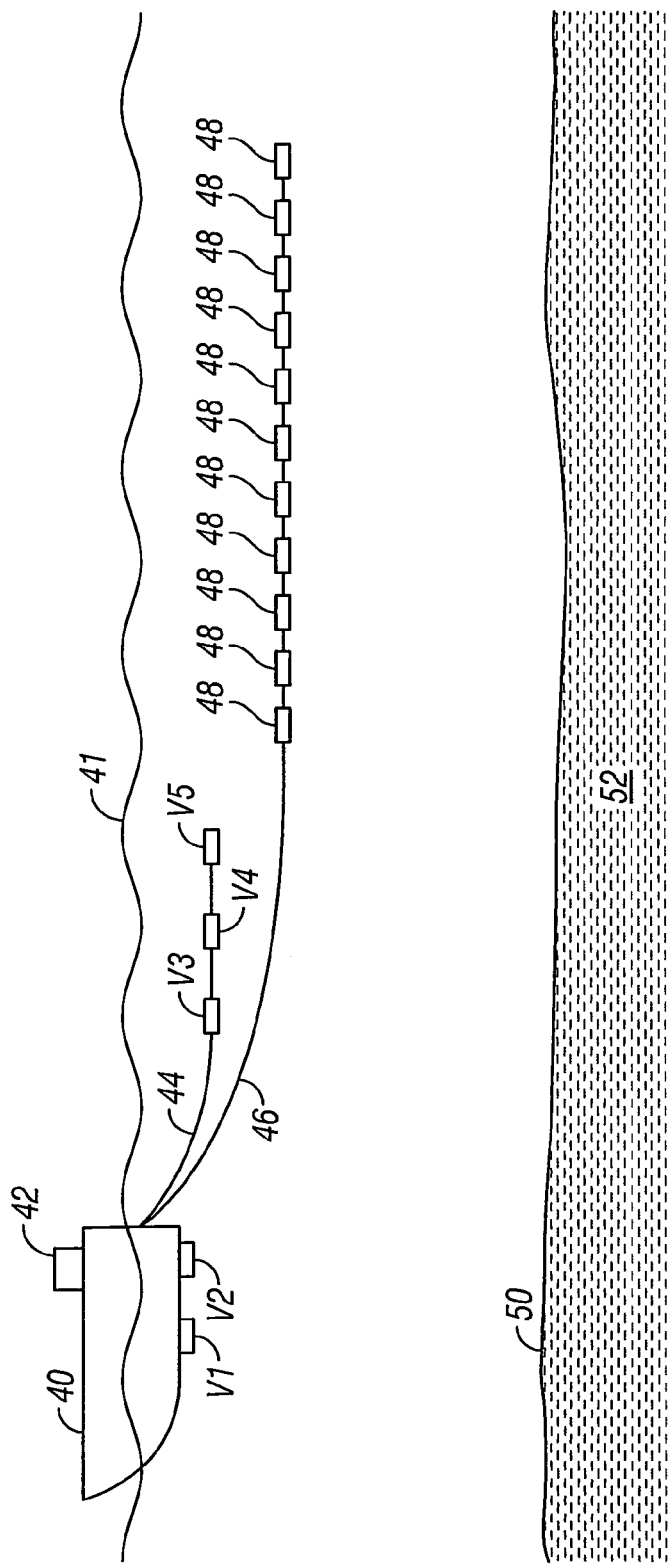
FIG. 4 shows an example of a marine seismic acquisition system using at least one acoustic vibrator according to FIG. 2.

FIG. 4 shows a marine acquisition system that can use one or more marine acoustic vibrator type energy sources according to the explanation provided above. Each of the acoustic vibrators V1-V5 shown in FIG. 4 may be mounted in a suitable housing for coupling to the hull of a survey vessel 40 (e.g., V1 and V2) and/or for being towed at the end of a suitable cable 44 (e.g., V3, V4, V5). Each acoustic vibrator V1-V5 may have a different operating frequency range including two resonances, as explained above, to provide substantially constant amplitude output within a selected frequency range. At least one of such frequency ranges is contemplated as being between about 1 and about 10 Hz, according to the example shown in FIG. 2. Examples of suitable housing structures are generally shown in U.S. Pat. No. 7,551, 518 issued to Tenghamn and commonly owned with the present invention. The survey vessel 40 moves along the surface 41 of a body of water, such as a lake or the ocean. As energy is emitted by the acoustic vibrators V1-V5, it travels downwardly through the water and the rock formations 52 below the water bottom 50. Reflected energy is detected by seismic sensors 48 disposed along one or more streamers 46 towed by the survey vessel or another vessel. The type of seismic sensor is not a limit on the scope of the present invention and may be hydrophones of other pressure responsive sensor, geophones, accelerometers or other motion responsive sensor, or combinations thereof. Signals generated by the sensors are communicated to equipment on the vessel 40, shown generally at 42 and referred to for convenience as a "recording system." The recording system 42 typically includes devices (none shown separately) for navigating the vessel 40, for actuating the acoustic vibrators V1-V5, for example, electrical controller with swept frequency alternating current or other signal, and for recording signals generated by the seismic sensors 48.

Figure 5:
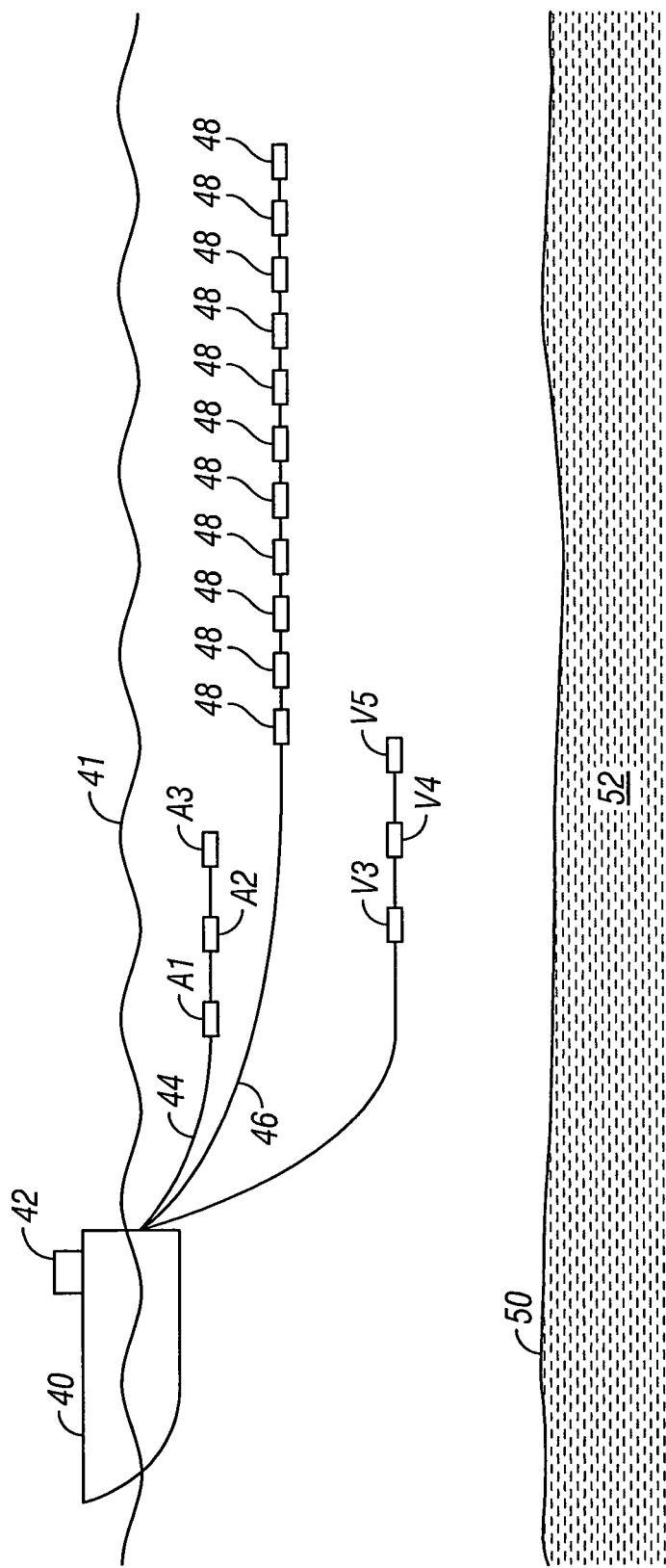
FIG. 5 shows an alternative example of a marine seismic acquisition system using at least one acoustic vibrator according to FIG. 2.

FIG. 5 shows an alternative marine acquisition system that uses air guns in conjunction with one or more marine acoustic vibrator type energy sources according to the explanation provided above. In this system, air guns A1-A3 may provide a source of impulsive seismic energy in the range of about 5 to 10 Hz at a depth of between about 6 and 10 meters. Acoustic vibrators V3-V5 may work with the air guns, providing a source of seismic energy in the range of about 1 to 5 Hz at a depth of between about 60 and 70 meters. In some embodiments, acoustic vibrators V3-V5 may be towed along the water bottom 50. As illustrated, the seismic sensors may be towed at a depth between that of the air guns A1-A3 and acoustic vibrators V3-V5. For example, the seismic sensors may be towed at a depth of between about 15 and 25 meters. As would be understood by one of ordinary skill in the art with the benefit of this disclosure, surface reflections may attenuate very low frequency signals. By towing the lower frequency acoustic vibrators V3-V5 at a greater depth than the higher frequency air guns A1-A3, the effects of surface reflections may be minimized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic source, comprising:
   a flextensional shell defining a longer axis and a shorter axis; a fixture coupled to the flextensional shell proximate an end of the longer axis; and
   at least one driver coupled to the fixture and coupled to the flextensional shell proximate an end of the shorter axis, the driver comprising two transmission elements on either side of the fixture, wherein movement of the two transmission elements is transferred to the flextensional shell proximate the end of the shorter axis.

2. The seismic source of claim 1, wherein the seismic source has a first resonance frequency between about 1 and about 10 Hz when disposed in water.

3. The seismic source of claim 1, wherein the driver comprises a moving coil driver.

4. The seismic source of claim 1, further comprising a second driver, wherein each driver is coupled to the flextensional shell proximate an end of the shorter axis.

5. The seismic source of claim 1, wherein a stroke length of the driver is between about 2 and about 10 inches.

6. The seismic source of claim 1, wherein the two transmission elements are each connected to the flextensional shell, and wherein the seismic source further comprises two magnetic circuitries connected to the fixture.

7. The seismic source of claim 1, wherein seismic source further comprises two electric coils and two magnetic circuitries, wherein each of the two magnetic circuitries are configured to generate a magnetic flux that causes a corresponding one of the electric coils to move, wherein motion of one of the electric coils is transferred to a corresponding one of the transmission elements.

8. A seismic source comprising:
a flextensional shell defining a longer axis and a shorter axis;
at least one driver coupled to the flextensional shell proximate an end of the shorter axis;
at least one inner spring coupled to the flextensional shell; and
a plurality of masses coupled to the inner spring.

9. The seismic source of claim 8, wherein the seismic source has a first and a second resonance frequencies between about 1 and about 50 Hz when disposed in water.

10. The seismic source of claim 8, wherein the inner spring comprises a substantially elliptical shape, the inner spring is coupled to the flextensional shell proximate each end of a major axis of the elliptical shape, and the masses are disposed proximate each end of a minor axis of the elliptical shape.

11. The seismic source of claim 8, wherein the inner spring comprises a substantially elliptical shape, the inner spring is coupled to the flextensional shell proximate each end of a minor axis of the elliptical shape, and the masses are disposed proximate each end of a major axis of the elliptical shape.

12. A marine seismic survey system, comprising:
at least one vessel;
at least one seismic source, the seismic source comprising:
a flextensional shell defining a longer axis and a shorter axis; and
a fixture coupled to the flextensional shell proximate an end of the longer axis; and
at least one driver coupled to the fixture and coupled to the flextensional shell proximate an end of the shorter axis, the driver comprising two transmission elements on either side of the fixture, wherein movement of the two transmission elements is transferred to the flextensional shell proximate the end of the shorter axis; and
an electrical controller capable of controlling the driver.

13. The marine seismic survey system of claim 12, wherein the seismic source has a first resonance frequency between about 1 and about 10 Hz when disposed in water.

14. The marine seismic survey system of claim 12, wherein the seismic source further comprises:
at least one inner spring coupled to the flextensional shell; and 15. The marine seismic survey system of claim 14, wherein the seismic source has first and a second resonance frequencies between about 1 and about 50 Hz when disposed in water.

16. The marine seismic survey system of claim 12, wherein the driver comprises a moving coil driver having a stroke length of between about 2 and about 10 inches.

17. The marine seismic system of claim 12, wherein the at least one seismic source is coupled to a hull of the vessel.

18. The marine seismic system of claim 12, wherein the at least one seismic source is coupled to the vessel by a tow cable.

19. The marine seismic system of claim 12, further comprising at least one air gun, wherein a depth of the at least one air gun is less than a depth of the at least one seismic source.

20. A method of marine seismic surveying, comprising:
towing a seismic sensor streamer with a vessel through a body of water over a subterranean formation;
controlling a seismic source to generate a seismic signal, wherein the seismic source comprises:
a flextensional shell defining a longer axis and a shorter axis; and
at least one driver coupled to the flextensional shell proximate an end of the shorter axis;
allowing the seismic signal to propagate through the body of water and the subterranean formation to provide a modified seismic signal; and
detecting the modified seismic signal with the seismic sensor streamer;
wherein the seismic source further comprises:
at least one inner spring coupled to the flextensional shell; and
a plurality of masses coupled to the inner spring.

21. The method of claim 20, wherein the seismic source has a first resonance frequency between about 1 and about 10 Hz when disposed in water.

22. The method of claim 20, wherein the seismic source has a first and a second resonance frequencies between about 1 and about 50 Hz when disposed in water.

23. The method of claim 20, further comprising towing at least one air gun at a depth less than a depth of the at least one seismic source.

24. A method of marine seismic surveying, comprising:
towing a seismic sensor streamer with a vessel through a body of water over a subterranean formation;
controlling a seismic source to generate a seismic signal, wherein the seismic source comprises:
a flextensional shell defining a longer axis and a shorter axis; and
at least one driver coupled to the flextensional shell proximate an end of the shorter axis;
allowing the seismic signal to propagate through the body of water and the subterranean formation to provide a modified seismic signal; and detecting the modified seismic signal with the seismic sensor streamer;
wherein the seismic source further comprises a fixture coupled to the driver and coupled to the flextensional shell proximate an end of the longer axis, and wherein the driver comprises two transmission elements on either side of the fixture, wherein movement of the two transmission elements is transferred to the flextensional shell proximate the end of the shorter axis.

25. The method of claim 24, wherein the seismic source has a first resonance frequency between about 1 and about 10 Hz when disposed in water.

* * * * *